United States Patent
Chen et al.

(10) Patent No.: US 10,757,065 B2
(45) Date of Patent: Aug. 25, 2020

(54) DOMAIN NAME RESOLUTION METHOD, DEVICE AND SYSTEM, AND STORAGE MEDIUM

(71) Applicant: Tencent Technology (Shenzhen) Company Limited, Shenzhen (CN)

(72) Inventors: Fangzhou Chen, Shenzhen (CN); Jiangqi Wu, Shenzhen (CN); Fengbo Jiang, Shenzhen (CN); Jun Qin, Shenzhen (CN)

(73) Assignee: TENCENT TECHNOLOGY (SHENZHEN) COMPANY LIMITED, Shenzhen, Guangdong Province (CN)

(*) Notice: Subject to any disclaimer, the term of this patent is extended or adjusted under 35 U.S.C. 154(b) by 0 days.

(21) Appl. No.: 16/362,456

(22) Filed: Mar. 22, 2019

(65) Prior Publication Data
US 2019/0222551 A1    Jul. 18, 2019

Related U.S. Application Data

(63) Continuation of application No. PCT/CN2017/110342, filed on Nov. 10, 2017.

(30) Foreign Application Priority Data

Nov. 28, 2016 (CN) .......................... 2016 1 1078704

(51) Int. Cl.
    H04L 29/12 (2006.01)
(52) U.S. Cl.
    CPC .......... *H04L 61/10* (2013.01); *H04L 61/1511* (2013.01); *H04L 61/2507* (2013.01); *H04L 61/35* (2013.01)

(58) Field of Classification Search
    CPC . H04L 61/10; H04L 61/1511; H04L 61/2507; H04L 61/35
    See application file for complete search history.

(56) References Cited

U.S. PATENT DOCUMENTS

| 8,463,877 B1 * | 6/2013 | Richardson ........... H04L 67/327 709/219 |
| 8,577,992 B1 * | 11/2013 | Richardson ......... H04L 61/1511 709/217 |

(Continued)

FOREIGN PATENT DOCUMENTS

| CN | 102307248 A | 1/2012 |
| CN | 105681491 A | 6/2016 |
| CN | 106453692 A | 2/2017 |

OTHER PUBLICATIONS

Tencent Technology, Written Opinion, PCT/CN2017/110342, dated Jan. 30, 2018, 5 pgs.

(Continued)

*Primary Examiner* — Jerry B Dennison
(74) *Attorney, Agent, or Firm* — Morgan, Lewis & Bockius LLP

(57) ABSTRACT

Embodiments of the present disclosure disclose a domain name resolution method, apparatus, and system, and a storage medium. The method includes: receiving a domain name resolution request sent by a network device, the domain name resolution request carrying a first target domain name that needs to be resolved; using the first target domain name as an initial value of a second target domain name; resolving the second target domain name, to obtain a corresponding resolution result; determining whether the resolution result is corresponds to a network address of a preset type; and repeating the aforementioned operations using the resolution result as the second target domain name until a resolution result corresponding to the network (Continued)

address of the preset type is obtained; and after obtaining the resolution result corresponding to the network address of the preset type, returning the resolution result to the network device.

18 Claims, 4 Drawing Sheets

(56) References Cited

U.S. PATENT DOCUMENTS

| | | | | |
|---|---|---|---|---|
| 9,003,035 | B1* | 4/2015 | Richardson | G06F 16/43 709/226 |
| 10,097,448 | B1* | 10/2018 | Howard | H04L 43/0894 |
| 2002/0172206 | A1* | 11/2002 | Vaman | H04L 29/12047 370/395.52 |
| 2009/0248786 | A1* | 10/2009 | Richardson | H04L 29/08099 709/201 |
| 2009/0327517 | A1* | 12/2009 | Sivasubramanian | H04L 67/02 709/238 |
| 2010/0125673 | A1* | 5/2010 | Richardson | H04L 61/609 709/239 |
| 2010/0125675 | A1* | 5/2010 | Richardson | H04L 61/15 709/242 |
| 2013/0103784 | A1* | 4/2013 | Lyon | H04L 61/1552 709/217 |
| 2013/0297826 | A1 | 11/2013 | Raciborski et al. | |
| 2016/0036943 | A1* | 2/2016 | Kish | H04L 61/6013 709/203 |
| 2019/0222551 | A1* | 7/2019 | Chen | H04L 61/35 |

OTHER PUBLICATIONS

Tencent Technology, IPRP, PCT/CN2017/110342, dated May 28, 2019, 6 pgs.

Tencent Technology, ISR, PCT/CN2017/110342, dated Jan. 30, 2018, 2 pgs.

* cited by examiner

DOMAIN NAME RESOLUTION METHOD, DEVICE AND SYSTEM, AND STORAGE MEDIUM

CROSS-REFERENCE TO RELATED APPLICATIONS

This application is a continuation of PCT Application PCT/CN2017/110342, entitled "DOMAIN NAME RESOLUTION METHOD, DEVICE AND SYSTEM, AND STORAGE MEDIUM" filed Nov. 10, 2017, which claims priority to Chinese Patent Application No. 201611078704.6, filed with the Chinese Patent Office on Nov. 28, 2016 and entitled "DOMAIN NAME RESOLUTION METHOD, APPARATUS, AND SYSTEM", all of which are incorporated herein by reference in their entirety.

FIELD OF THE TECHNOLOGY

Embodiments of the present disclosure relate to the field of communications technologies, and specifically, to a domain name resolution method, apparatus, and system, and a storage medium.

BACKGROUND OF THE DISCLOSURE

An Internet Protocol (IP) address is a numeric address for identifying a site in a network. For ease of memorization, generally, an IP address is replaced with a domain name to identify a site address, and domain name resolution is a process of converting a domain name into an IP address. To enable a user to access an IP address corresponding to a domain name, domain name resolution needs to be used.

SUMMARY

Embodiments of the present disclosure provide a domain name resolution method, apparatus, and system, and a storage medium.

A first aspect of the present disclosure provides a domain name resolution method performed at a server having one or more processors and memory storing a plurality of programs to be executed by the one or more processors, the method comprising:

receiving a domain name resolution request sent by a network device, the domain name resolution request carrying a first target domain name that needs to be resolved;

using the first target domain name as an initial value of a second target domain name;

resolving the second target domain name, to obtain a corresponding resolution result;

determining whether the resolution result corresponds to a network address of a preset type;

repeating the aforementioned operations using the resolution result as the second target domain name until a resolution result corresponding to the network address of the preset type is obtained; and after obtaining the resolution result corresponding to the network address of the preset type, returning the resolution result to the network device.

A second aspect of the present disclosure further provides a server for domain name resolution, comprising one or more processors, memory coupled to the one or more processors, and a plurality of computer-readable instructions that, when executed by the one or more processors, cause the server to perform the foregoing domain name resolution method.

A third aspect of the present disclosure further provides a non-transitory computer readable storage medium storing a plurality of instructions in connection with a server having one or more processors, wherein the plurality of instructions, when executed by the one or more processors, cause the server to perform the foregoing domain name resolution method.

BRIEF DESCRIPTION OF THE DRAWINGS

To describe the technical solutions in the embodiments of the present disclosure more clearly, the following briefly describes the accompanying drawings required for describing the embodiments. Apparently, the accompanying drawings in the following description show merely some embodiments of the present disclosure, and a person skilled in the art may still derive other drawings from these accompanying drawings without creative efforts.

DESCRIPTION OF EMBODIMENTS

The following clearly and completely describes the technical solutions in the embodiments of the present disclosure with reference to the accompanying drawings in the embodiments of the present disclosure. Apparently, the described embodiments are merely some but not all of the embodiments of the present disclosure. All other embodiments obtained by a person of ordinary skill in the art based on the embodiments of the present disclosure without creative efforts shall fall within the protection scope of the present disclosure.

Embodiments of the present disclosure provide a domain name resolution method, apparatus, and system.

The domain name resolution system may include any one of domain name resolution apparatuses provided in embodiments of the present disclosure. The domain name resolution apparatus may be specifically integrated into a server, for example, an authorized DNS (that is, an authorized DNS server). The authorized DNS is a server that resolves a domain name with higher level authorization. In addition, the domain name resolution system may further include another device such as a recursive DNS. The recursive DNS is mainly configured to: receive a query of a user for any domain name, send a domain name resolution request to the domain name resolution apparatus, receive a resolution result returned by the domain name resolution apparatus, and return a result to the user.

Figure 1A:
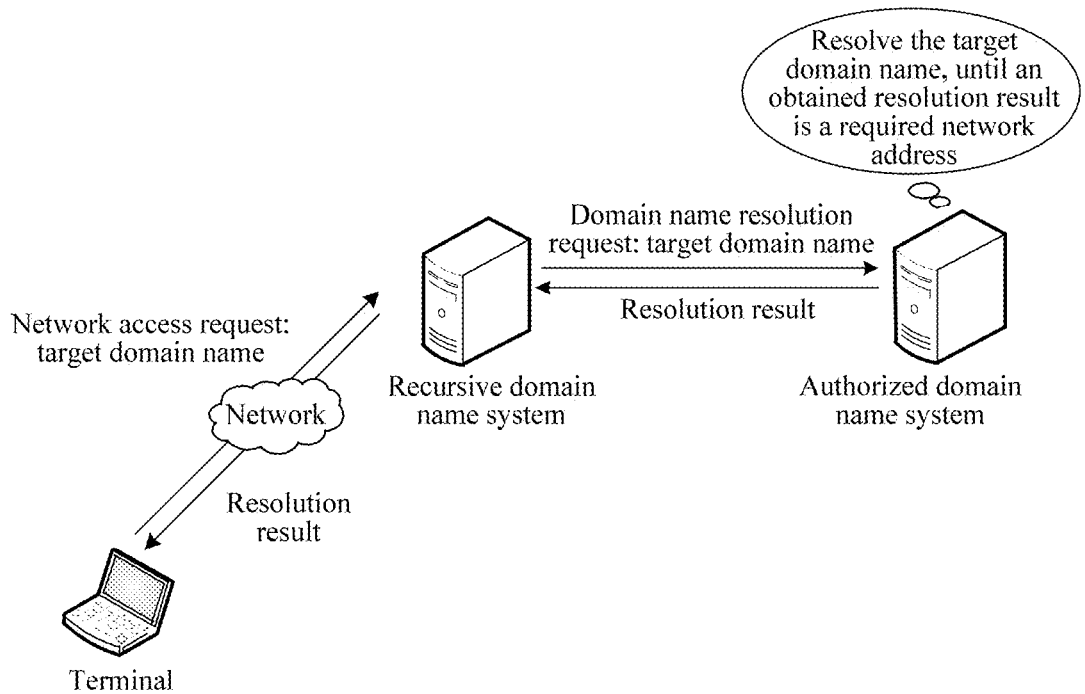
FIG. 1a is a schematic diagram of a scenario of a domain name resolution method according to an embodiment of the present disclosure.

For example, an example in which the domain name resolution apparatus is specifically integrated into an authorized DNS is used. Referring to FIG. 1a, when receiving a network access request triggered by a user by using a terminal and carrying a target domain name, a recursive DNS may generate a domain name resolution request according to the network access request, and send the domain name resolution request to the authorized DNS. After receiving the domain name resolution request, the authorized DNS may resolve the target domain name that is carried in the domain name resolution request, and then determine whether the resolution result is a network address of a preset type, for example, determine whether the resolution result is a finally required IP address; and if yes, send the resolution result to the recursive DNS, so that the recursive DNS provides the resolution result to the terminal; or if not, use the resolution result as a new target domain name and continue to perform resolution, and when obtaining a finally required network address, return the resolution result to the recursive DNS at a time, that is, update the target domain name to the resolution result, and go back to the step of resolving the target domain name.

Detailed descriptions are separately provided below. It should be noted that, sequence numbers of the following embodiments are not intended to limit a preferred sequence of the embodiments.

Embodiment 1

This embodiment is described from the perspective of a domain name resolution apparatus. The domain name resolution apparatus may be specifically integrated into a server, for example, a device such as an authorized DNS (that is, an authorized DNS server).

It may be understood that, the authorized DNS includes a memory and a processor. The memory stores instructions executable by the processor, and the processor implements a domain name resolution method by executing the instructions. The method includes: receiving a domain name resolution request that is sent by a network device and that carries a target domain name that needs to be resolved; resolving the target domain name, to obtain a resolution result; determining whether the resolution result is a network address of a preset type; and if not, updating the target domain name to the resolution result, and going back to the step of resolving the target domain name; or if yes, sending the resolution result to the network device.

Figure 1B:
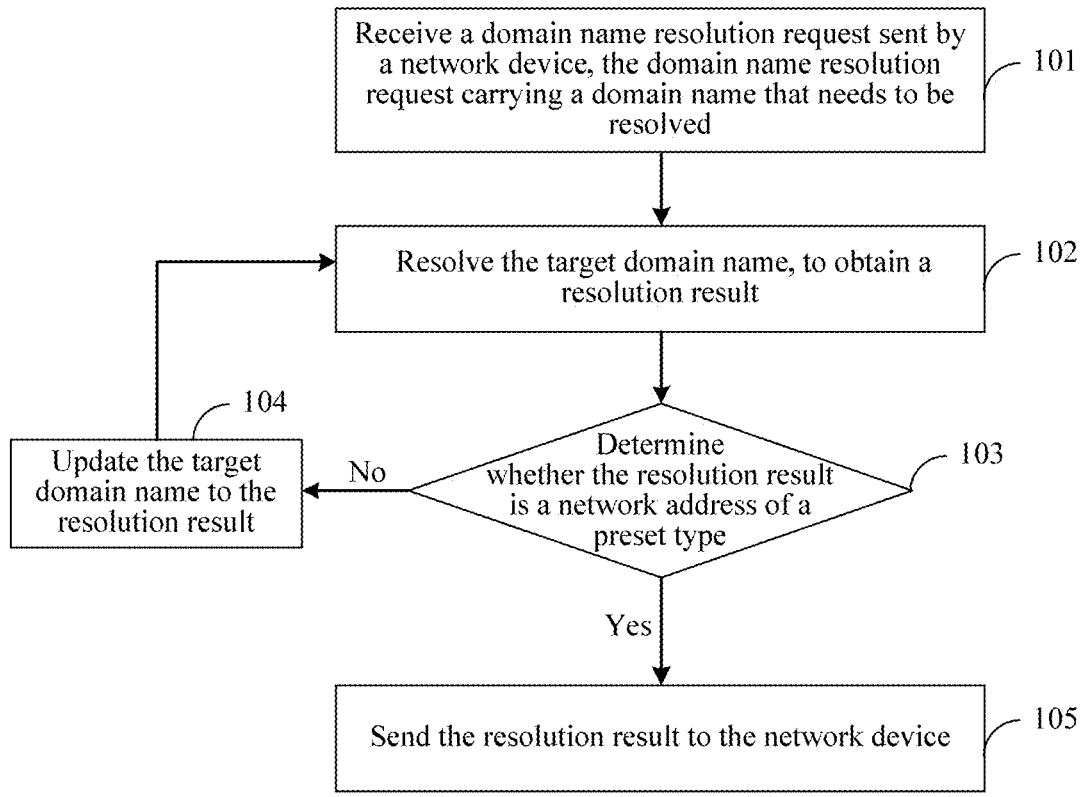
FIG. 1b is a flowchart of a domain name resolution method according to an embodiment of the present disclosure.

As shown in FIG. 1b, a specific procedure of the domain name resolution method may be as follows:

101: Receive a domain name resolution request sent by a network device, the domain name resolution request carrying information such as a domain name that needs to be resolved. For ease of description, in this embodiment of the present disclosure, the domain name that needs to be resolved is referred to as a target domain name.

For example, specifically, a domain name resolution request sent by a recursive DNS may be received. The domain name resolution request may be generated when the recursive DNS receives a network access request triggered by a user.

It may be understood that, in a subsequent step, the target domain name may be updated. Therefore, when the following step 102 is performed each time, the target domain name may be different, and an obtained resolution result is also different. Therefore, the target domain name in step 101 is referred to as a first target domain name, and the first target domain name is used as an initial value of a second target domain name. The second target domain name is a target domain name in the following step 102 to step 105. That is, 101 may also be described as "receiving a domain name resolution request sent by a network device, the domain name resolution request carrying a first target domain name that needs to be resolved; and using the first target domain name as an initial value of a second target domain name".

102: Resolve the target domain name, to obtain a resolution result.

Herein, the target domain name is actually the second target domain name. When it is the first time to perform step 102, the second target domain name is the first target domain name. When it is not the first time to perform step 102, the second target domain name is not the first target domain name, but is a resolution result obtained in step 102 that is performed a previous time.

For example, specifically, configuration information of the target domain name may be searched for; and an address to which the target domain name points may be determined according to the configuration information, to obtain the resolution result.

The configuration information may be specifically resolution records of multiple record types, for example, a canonical name (CNAME) record or an A record. The A record is a record used to specify an IP address corresponding to a domain name. The CNAME record is a record for pointing a domain name to another domain name.

103: Determine whether the resolution result is a network address of a preset type; and if not, perform step 104; or if yes, perform step 105.

A type of the network address may be set according to an actual application requirement. For example, the network address may be set as an IP address. Therefore, whether the resolution result is an IP address may be determined; and if not, step 104 is performed; or if yes, step 105 is performed.

For example, if a record type of the configuration information of the target domain name is a CNAME record, the obtained resolution result is another domain name. Therefore, in this case, it may be determined that the resolution result is not a finally required IP address, and the resolution result needs to continue to be resolved, so that step 104 is performed. However, if a record type of the configuration information of the target domain name is an A record, the obtained resolution result is an IP address. Therefore, in this case, it may be determined that the resolution result is a finally required IP address, so that step 105 is performed.

It may be learned that, for the A record, the obtained resolution result is a finally required network address. Therefore, the resolution result does not need to continue to be resolved. For the CNAME record, the obtained resolution result needs to continue to be resolved. Therefore, to improve flexibility and processing efficiency, a record type of a resolution record corresponding to the target domain name may be determined first, and when it is determined that the record type is a CNAME record, and accelerated resolution needs to be performed, the step of "determining whether the resolution result is a network address of a preset type" is performed. That is, after the step of "searching for configuration information of the target domain name", the domain name resolution method may further include:

determining, when it is determined that a record type of the configuration information is a CNAME record, whether accelerated resolution needs to be performed on the target domain name; and if yes, after the resolution result is obtained, performing the step of determining whether the resolution result is a network address of a preset type; or if not, sending the resolution result to the network device after the resolution result is obtained.

There may be multiple manners of determining whether accelerated resolution needs to be performed on the target domain name. For example, a corresponding identifier may be set for an "accelerated resolution function". When the identifier indicates that the "accelerated resolution function" is enabled, it is determined that accelerated resolution needs to be performed on the target domain name; or if the identifier indicates that the "accelerated resolution function" is disabled, it is determined that accelerated resolution does not need to be performed on the target domain name. Whether the "accelerated resolution function" is enabled may be voluntarily set by a user, and details are not described herein.

Optionally, to reduce procedures and improve processing efficiency, when it is determined that a record type of a resolution record corresponding to the target domain name is an A record, the resolution result may be directly sent to the corresponding network device such as the recursive DNS. That is, after the step of "searching for configuration information of the target domain name", the domain name resolution method may further include:

sending the resolution result to the network device after the resolution result is obtained when it is determined that a record type of the configuration information is an A record.

104: Update the target domain name to the resolution result, and go back to the step of resolving the target domain name, that is, go back to step 103.

It may be understood that, "updating the target domain name to the resolution result" may also be described as "using the resolution result as the second target domain name". After the update, the second target domain name is changed.

For example, an example in which the target domain name is "www.a.com" is used. If the resolution result obtained by resolving the target domain name is "www.b.com", "www.b.com" may be used as a new target domain name, and the new target domain name is resolved. Similarly, if a resolution result obtained after the new target domain name is resolved is a domain name, the resolution result also needs to be used as a new target domain name and continues to be resolved. If a resolution result obtained after the new target domain name is resolved is a network address of a preset type, for example, an IP address "1.2.3.4", resolution does not need to be performed, and the resolution result may be sent to the network device, for example, sent to the recursive DNS (that is, step 105 is performed).

Optionally, to prevent a fault when the resolution result continues to be resolved, for example, configuration information corresponding to the resolution result cannot be obtained, before the target domain name is updated to the resolution result, whether the configuration information of the resolution result exists in a local or preset storage device may be determined, and if yes, the step of updating the target domain name to the resolution result is performed. That is, before the step of "updating the target domain name to the resolution result", the domain name resolution method may further include:

determining whether configuration information of the resolution result exists; and if yes, performing the step of updating the target domain name to the resolution result; or if not, sending the resolution result to the network device, that is, performing step 105.

105: Send the resolution result to the network device, for example, send the resolution result to the recursive DNS.

Optionally, when the resolution result is sent to the network device, if resolution is performed multiple times, in addition to sending a final resolution result to the network device, for example, to the recursive DNS, another resolution result generated in the resolution process may be sent to the network device. Details are not described herein again.

It may be learned from the above that, in this embodiment, after the domain name resolution request sent by the network device is received, the target domain name may be resolved; when it is determined that the resolution result is not a network address of a preset type, the resolution result may be used as a new target domain name and resolution may continue to be performed; and when a finally required network address is obtained, the resolution result may be returned to the network device at a time. It may be learned that, for multiple levels of CNAME records, in this solution, only one resolution request needs to be made to obtain the required resolution result. Therefore, compared with an existing solution in which multiple resolution requests need to be made, this solution can simplify a procedure, shorten a resolution time, and greatly improve overall resolution efficiency.

Embodiment 2

According to the method described in Embodiment 1, further description is provided below by using an example.

In this embodiment, an example in which the domain name resolution apparatus is specifically integrated into the authorized DNS, the network device is specifically the recursive DNS, and the network address of the preset type is an IP address is used for description.

Figure 2A:
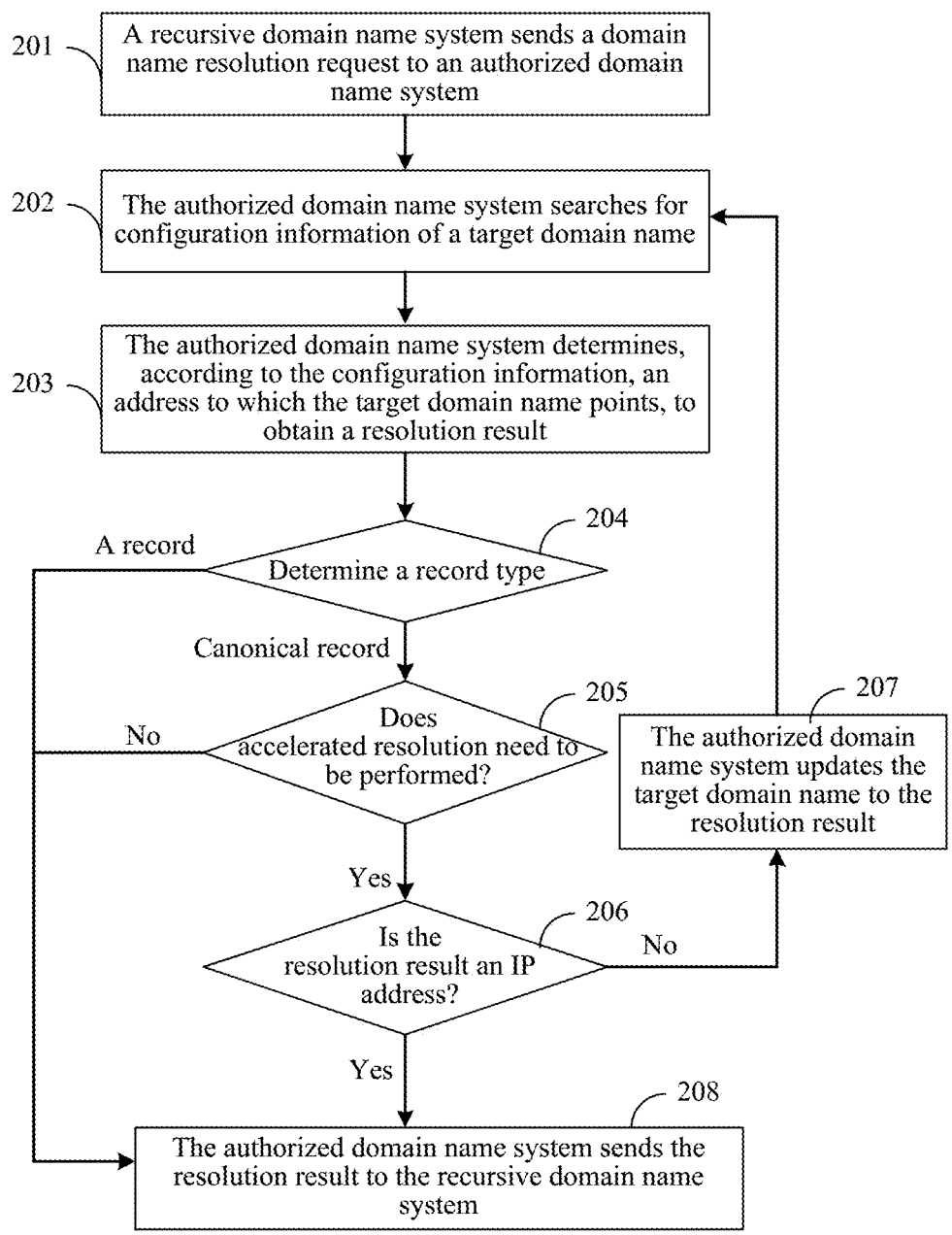
FIG. 2a is another flowchart of a domain name resolution method according to an embodiment of the present disclosure.

As shown in FIG. 2*a*, a specific procedure of a domain name resolution method may be as follows:

201: The recursive DNS (that is, a recursive DNS server) sends a domain name resolution request to the authorized DNS (that is, an authorized DNS server).

The domain name resolution request may carry information such as a target domain name that needs to be resolved.

202: The authorized DNS searches for configuration information of a target domain name after receiving the domain name resolution request. Herein, the target domain name is actually a first target domain name. The first target domain name is used as an initial value of a second target domain name, and a subsequent step is performed.

For example, specifically, a local (that is, the authorized DNS) or specified storage device may be searched for the configuration information of the target domain name.

The configuration information may be specifically resolution records of multiple record types, for example, a CNAME record or an A record. The A record is a record used to specify an IP address corresponding to a domain name. For example, an A record with a domain name "www.c.com" may be set in the authorized DNS, and a record value is "1.2.3.4". The CNAME record is a record for pointing a domain name to another domain name. For example, a CNAME record with a domain name "www.a.com" may be set in the authorized DNS, and a record value is "www.b.com", and a CNAME record with a domain name "www.b.com" may be set in the authorized DNS, and a record value is "www.c.com".

203: The authorized DNS determines, according to the configuration information, an address to which the target domain name points, to obtain a resolution result. That is, the authorized DNS determines, according to the configuration information, an address to which the second target domain name points, to obtain a corresponding resolution result.

For example, using an example in which the target domain name is "www.a.com", if the configuration information of the target domain name is a CNAME record, and a record value is "www.b.com", it may be determined that the address to which the target domain name points is "www.b.com". Therefore, it may be obtained that the resolution result is "www.b.com".

For another example, using an example in which the target domain name is "www.a.com", if the configuration information of the target domain name is an A record, and a record value is "1.2.3.4", it may be determined that the address to which the target domain name points is "1.2.3.4". Therefore, it may be obtained that the resolution result is "1.2.3.4". The rest may be deduced by analogy.

204: The authorized DNS determines a record type of the configuration information; and if the record type is a CNAME record, performs step 205; or if the record type is an A record, performs step 208.

For example, using an example in step 205, because a resolution record configured in the authorized DNS for the target domain name "www.a.com" is a CNAME record, and the record value "www.b.com", step 205 may be performed. If the target domain name is "www.c.com", because a resolution record configured in the authorized DNS for the target domain name is an A record, and the record value is "1.2.3.4", step 208 may be performed.

205: The authorized DNS determines whether accelerated resolution needs to be performed on the second target domain name; and if yes, performs step 206; or if not, performs step 208.

There may be multiple manners of determining whether accelerated resolution needs to be performed on the target domain name. For example, a corresponding identifier may be set for an "accelerated resolution function". When the identifier indicates that the "accelerated resolution function" is enabled, it is determined that accelerated resolution needs to be performed on the target domain name; or if the identifier indicates that the "accelerated resolution function" is disabled, it is determined that accelerated resolution does not need to be performed on the target domain name. Whether the "accelerated resolution function" is enabled may be voluntarily set by a user, and details are not described herein.

206: The authorized DNS determines whether the resolution result is an IP address; and if yes, performs step 208; or if not, performs step 207.

For example, if a record type of the configuration information of the target domain name is a CNAME record, the obtained resolution result is another domain name. Therefore, in this case, it may be determined that the resolution result is not a finally required IP address, and the resolution result needs to continue to be resolved, so that step 207 is performed. However, if a record type of the configuration information of the target domain name is an A record, the resolution result is an IP address. Therefore, in this case, it may be determined that the resolution result is a finally required IP address, so that step 208 is performed.

For example, still using the example in which the target domain name is "www.a.com", because the resolution record configured in the authorized DNS for the target domain name "www.a.com" is a CNAME record, and the record value is "www.b.com", step 207 may be performed.

For another example, if the target domain name is "www.c.com", because the resolution record configured in the authorized DNS for "www.c.com" is an A record, and the record value is "1.2.3.4", step 208 may be performed.

207: The authorized DNS updates the target domain name to the resolution result (that is, the resolution result is used as the second target domain name), and goes back to the step of searching for configuration information of the second target domain name, that is, goes back to step 202.

For example, if the resolution result is "www.b.com", "www.b.com" may be used as a new target domain name, and continues to be resolved.

Optionally, to prevent a fault when the resolution result continues to be resolved, for example, configuration information corresponding to the resolution result cannot be obtained, before the target domain name is updated to the resolution result, whether the configuration information of the resolution result exists in a local (that is, the authorized DNS) or preset storage device may be determined, and if yes, the step of updating the target domain name to the resolution result is performed; or if not, the resolution result is sent to the network device. That is, step 208 is performed.

208: The authorized DNS sends the resolution result to the recursive DNS.

Figure 2B:
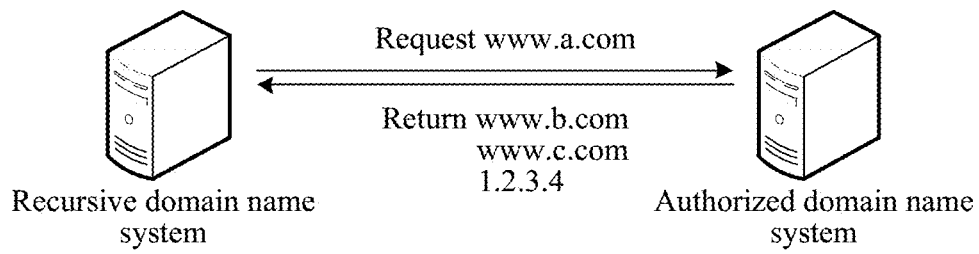
FIG. 2b is a schematic diagram of accelerated resolution in a domain name resolution method according to an embodiment of the present disclosure.

Optionally, when the resolution result is sent to the network device, if resolution is performed multiple times, in addition to sending a final resolution result to the network device, for example, to the recursive DNS, another resolution result generated in the resolution process may be sent to the network device. For example, using an example in which the target domain name is "www.a.com", details are as follows:

The resolution recorded configured in the authorized DNS for the domain name "www.a.com" is a CNAME record, and the record value is "www.b.com", the resolution recorded configured in the authorized DNS for the domain name "www.b.com" is also a CNAME record, and the record value is "www.c.com", and the resolution recorded configured in the authorized DNS for the domain name "www.c.com" is an A record, and the record value is "1.2.3.4". Therefore, when "www.a.com" is used as the target domain name and resolution is performed the first time, an obtained resolution result is "www.b.com". Assuming that accelerated resolution is enabled, "www.b.com" needs to be used as a new target domain name and resolution continues to be performed the second time, and an obtained resolution result is "www.c.com". Assuming that accelerated resolution is also enabled for the domain name "www.c.com", "www.c.com" needs to be used as a new target domain name and resolution continues to be performed the third time, and an obtained resolution result is "1.2.3.4", and is a finally required IP address. Therefore, "1.2.3.4" may be used as a final resolution result and sent to the recursive DNS. Optionally, in addition, other resolution results generated in the resolution process, that is, "www.b.com" and "www.c.com" are also sent to the recursive DNS. Refer to FIG. 2b.

It may be understood that, step 205 of determining whether accelerated resolution needs to be performed may be performed before the cycle is entered, that is, before step 202. In this way, whether accelerated resolution needs to be performed does not need to be determined in each cycle, thereby further increasing a domain name resolution speed.

Figure 2C:
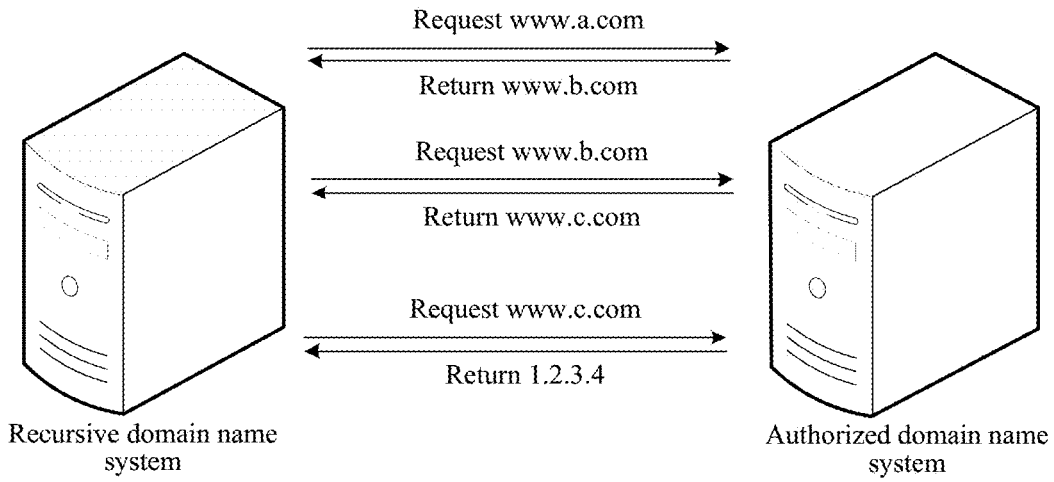
FIG. 2c is a schematic diagram of non-accelerated resolution in a domain name resolution method according to an embodiment of the present disclosure.

It should be noted that, if accelerated resolution is not enabled, as shown in FIG. 2c, the recursive DNS needs to send three resolution requests to the authorized DNS to obtain the final IP address. Details are as follows:

1. The recursive DNS requests the authorized DNS to resolve "www.a.com", and the authorized DNS returns the resolution result "www.b.com".

2. The recursive DNS requests the authorized DNS to resolve "www.b.com", and the authorized DNS returns the resolution result "www.c.com".

3. The recursive DNS requests the authorized DNS to resolve "www.c.com", and the authorized DNS returns the resolution result "1.2.3.4".

It may be learned from the above that, in this embodiment, after receiving the domain name resolution request sent by the recursive DNS, the authorized DNS may resolve the target domain name; when determining that the resolution result is not a network address of a preset type, use the resolution result as a new target domain name and continue to perform resolution; and when obtaining a finally required network address, return the resolution result to the recursive DNS at a time. It may be learned that, for multiple levels of CNAME records, in this solution, only one resolution request needs to be made to obtain the required resolution result. Therefore, compared with an existing solution in which multiple resolution requests need to be made, this solution can simplify a procedure, shorten a resolution time, and greatly improve overall resolution efficiency. In addition, whether accelerated resolution is performed may be further set, so that operation flexibility is greatly improved.

Embodiment 3

Figure 3A:
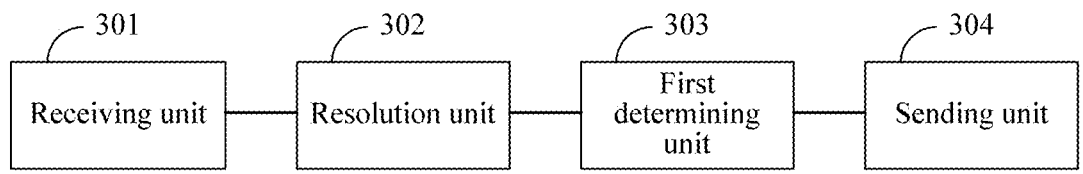
FIG. 3a is a schematic structural diagram of a domain name resolution apparatus according to an embodiment of the present disclosure.

To better implement the foregoing method, this embodiment of the present disclosure further provides a domain name resolution apparatus. As shown in FIG. 3a, the domain name resolution apparatus may be integrated into an authorized DNS, and the apparatus may include:

one or more memories; and one or more processors.

The one or more memories store one or more instruction modules, configured to be executed by the one or more processors.

The one or more instruction modules include a receiving unit 301, a resolution unit 302, a first determining unit 303, and a sending unit 304. Details are as follows:

(1) The Receiving Unit 301

The receiving unit 301 is configured to receive a domain name resolution request sent by a network device, the domain name resolution request carrying a target domain name that needs to be resolved.

For example, the receiving unit 301 may be specifically configured to receive a domain name resolution request sent by a recursive DNS, where the domain name resolution request may be generated when the recursive DNS receives a network access request triggered by a user.

(2) The Resolution Unit 302

The resolution unit 302 is configured to resolve the target domain name, to obtain a resolution result.

For example, the resolution unit 302 may be specifically configured to: search for configuration information of the target domain name; and determine, according to the configuration information, an address to which the target domain name points, to obtain the resolution result.

The configuration information may be specifically resolution records of multiple record types, for example, a CNAME record or an A record.

(3) The First Determining Unit 303

The first determining unit 303 is configured to: determine whether the resolution result is a network address of a preset type; and if not, update the target resolution result to the resolution result, and trigger the resolution unit 302 to perform the operation of resolving the target domain name.

A type of the network address may be set according to an actual application requirement. For example, the network address may be set as an IP address. That is, the first determining unit 303 may be specifically configured to: determine whether the resolution result is an IP address; and if not, update the target domain name to the resolution result, and trigger the resolution unit 302 to perform the operation of resolving the target domain name.

Optionally, to prevent a fault when the resolution result continues to be resolved, for example, configuration information corresponding to the resolution result cannot be obtained, before the target domain name is updated to the resolution result, whether the configuration information of the resolution result exists in a local or preset storage device may be determined, and if yes, the operation of updating the target domain name to the resolution result is performed. That is, the first determining unit 303 may be further configured to: before the target domain name is updated to the resolution result, determine whether configuration information of the resolution result exists; and if yes, perform the operation of updating the target domain name to the resolution result; or if not, trigger the sending unit 304 to perform the operation of sending the network device to the resolution result.

(4) The Sending Unit 304

The sending unit 304 is configured to send the resolution result to the network device when the first determining unit 303 determines that the resolution result is a network address of a preset type.

Optionally, when the resolution result is sent to the network device, if resolution is performed multiple times, in addition to sending a final resolution result to the network device, for example, to the recursive DNS, the sending unit 304 may send another resolution result generated in the resolution process to the network device. Details are not described herein again.

Figure 3B:
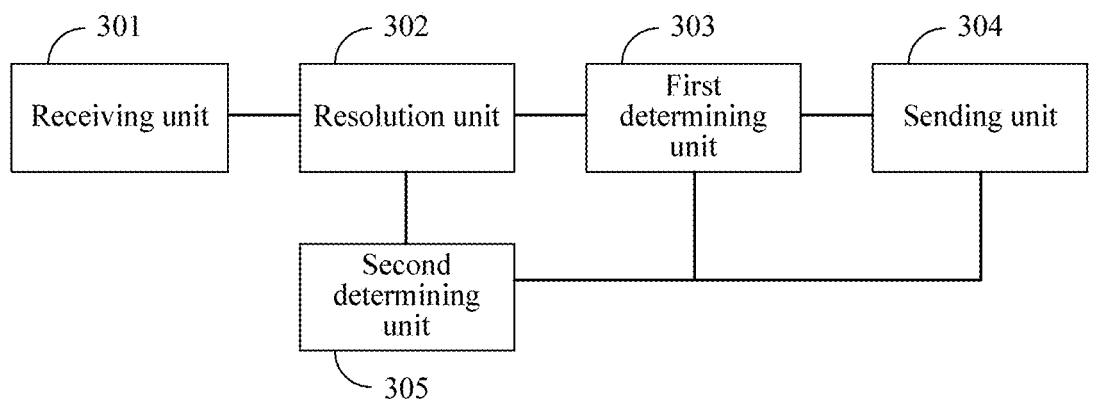
FIG. 3b is another schematic structural diagram of a domain name resolution apparatus according to an embodiment of the present disclosure.

To improve flexibility and processing efficiency, a record type of a resolution record corresponding to the target domain name may be determined first, and when it is determined that the record type is a CNAME record, and accelerated resolution needs to be performed, the operation of "determining whether the resolution result is a network address of a preset type" is performed. That is, as shown in FIG. 3b, the domain name resolution apparatus may further include a second determining unit 305. Details are as follows:

The second determining unit 305 is configured to: determine, when it is determined that a record type of the configuration information found by the resolution unit 302 is a CNAME record, whether accelerated resolution needs to be performed on the target domain name; and if yes, trigger, after the resolution unit 302 obtains the resolution result, the first determining unit 303 to perform the operation of determining whether the resolution result is a network address of a preset type; or if not, trigger, after the resolution unit 302 obtains the resolution result, the sending unit 304 to send the resolution result to the network device.

Optionally, to reduce procedures and improve processing efficiency, when it is determined that a record type of a resolution record corresponding to the target domain name is an A record, the resolution result may be directly sent to the corresponding network device. That is, the sending unit 304 may be further configured to: send the resolution result to the network device after the resolution unit 302 obtains the resolution result when it is determined that a record type of the configuration information found by the resolution unit 302 is an A record, for example, send the resolution result to the recursive DNS.

During specific implementation, the foregoing units may be implemented as separate entities or combined randomly, or implemented as a same entity or several entities. For specific implementations of the foregoing units, refer to the foregoing method embodiments. Details are not described herein again.

The domain name resolution apparatus may be specifically integrated into a server, for example, a device such as the authorized DNS.

It may be learned from the above that, in this embodiment, after the domain name resolution apparatus receives the domain name resolution request sent by the network device, the resolution unit 302 may resolve the target domain name; when the first determining unit 303 determines that the resolution result is not a network address of a preset type, the resolution result may be used as a new target domain name, and the resolution unit 3052 may continue to perform resolution; and when a finally required network address is obtained, the sending unit 304 may return the resolution result to the network device at a time. It may be learned that, for multiple levels of CNAME records, in this solution, only one resolution request needs to be made to obtain the required resolution result. Therefore, compared with an existing solution in which multiple resolution requests need to be made, this solution can simplify a procedure, shorten a resolution time, and greatly improve overall resolution efficiency.

Embodiment 4

Correspondingly, this embodiment of the present disclosure further provides a domain name resolution system, including any one of the domain name resolution apparatuses provided in the embodiments of the present disclosure. The domain name resolution apparatus may be specifically integrated into a server, for example, a device such as an authorized DNS. For example, an example in which the domain name resolution apparatus is integrated into the authorized DNS is used. Details may be as follows:

The authorized DNS is configured to: receive a domain name resolution request that is sent by a network device such as a recursive DNS and that carries a target domain name that needs to be resolved; resolve the target domain name, to obtain a resolution result; determining whether the resolution result is a network address of a preset type; and if not, update the target domain name to the resolution result, and go back to the step of resolving the target domain name; or if yes, send the resolution result to the network device.

For example, the authorized DNS may be specifically configured to: search for configuration information of the target domain name; and determine, according to the configuration information, an address to which the target domain name points, to obtain the resolution result.

The configuration information may be specifically resolution records of multiple record types, for example, a CNAME record or an A record.

Optionally, the authorized DNS may be further configured to: determine, when it is determined that a record type of the configuration information is a CNAME record, whether accelerated resolution needs to be performed on the target domain name; and if yes, after the resolution result is obtained, perform the operation of determining whether the resolution result is a network address of a preset type; or if not, send the resolution result to the network device (for example, the recursive DNS) after the resolution result is obtained.

Optionally, the authorized DNS may be further configured to send the resolution result to the network device after the resolution result is obtained when it is determined that a record type of the configuration information is an A record.

Optionally, the authorized DNS may be further configured to determine whether configuration information of the resolution result exists; and if yes, perform the operation of updating the target domain name to the resolution result; or if not, send the resolution result to the network device.

In addition, optionally, the domain name resolution system may further include another network device such as the recursive DNS. Details are as follows:

The recursive DNS may be configured to: send, to the authorized DNS, the domain name resolution request that carries the target domain name that needs to be resolved, and receive the resolution result sent by the authorized DNS.

For specific implementations of the foregoing devices, refer to the foregoing embodiments, and details are not described herein again.

Because the domain name resolution system may include any one of the domain name resolution apparatuses provided in the embodiments of the present disclosure, a beneficial effect that can be implemented by any one of the domain name resolution apparatuses provided in the embodiments of the present disclosure can be implemented. For details, refer to the foregoing embodiments, and details are not described herein again.

Embodiment 5

Figure 4:
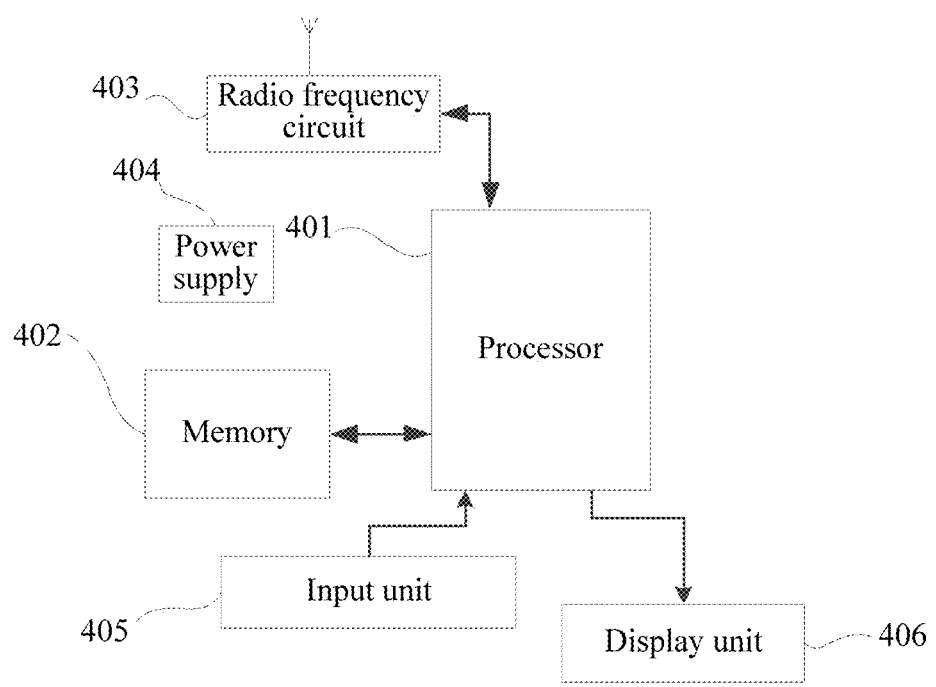
FIG. 4 is a schematic structural diagram of a server according to an embodiment of the present disclosure.

In addition, this embodiment of the present disclosure further provides a server. FIG. 4 is a schematic structural diagram of the server in this embodiment of the present disclosure. Details are as follows:

The server may include components such as a processor 401 having one or more processing cores, a memory 402 having one or more computer-readable storage mediums, a radio frequency (RF) circuit 403, a power supply 404, an input unit 405, and a display unit 406. A person skilled in the art may understand that the structure of the server shown in FIG. 4 does not constitute a limitation to the server, and the server may include more components or fewer components than those shown in the figure, or some components may be combined, or a different component deployment may be used.

The processor 401 is the control center of the server, and is connected to various parts of the server by using various interfaces and lines. The processor 401 performs various functions and data processing of the server by running or executing the software program and/or module stored in the memory 402, and invoking data stored in the memory 402, thereby performing overall monitoring on the server. Optionally, the processor 401 may include one or more processing cores. Preferably, the processor 401 may integrate an application processor and a modem processor. The application processor mainly processes an operating system, a user interface, an application program, and the like. The modem processor mainly processes wireless communication. It may be understood that the foregoing modem processor may not be integrated into the processor 401.

The memory 402 may be configured to store a software program and module. The processor 401 runs the software program and module stored in the memory 402, to implement various functional applications and data processing.

The memory 402 may mainly include a program storage area and a data storage area. The program storage area may store an operating system, an application program required by at least one function (such as a sound playback function and an image display function), and the like. The data storage area may store data created according to use of the server, and the like. In addition, the memory 402 may include a high-speed random access memory (RAM), and may further include a non-volatile memory, such as at least one magnetic disk storage device, a flash memory, or other volatile solid-state storage devices. Correspondingly, the memory 402 may further include a memory controller for the processor 401 to access the memory 402.

The RF circuit 403 may be configured to receive and send signals during information receiving and sending. Particularly, the RF circuit 401 receives downlink information from a base station, then delivers the downlink information to one or more processors 401 for processing, and sends related uplink data to the base station. Generally, the RF circuit 403 includes, but is not limited to, an antenna, at least one amplifier, a tuner, one or more oscillators, a subscriber identity module (SIM) card, a transceiver, a coupler, a low noise amplifier (LNA), and a duplexer. In addition, the RF circuit 403 may further communicate with a network and another device through wireless communication. The wireless communication may use any communications standard or protocol, which includes, but is not limited to, a Global System for Mobile communications (GSM), a general packet radio service (GPRS), Code Division Multiple Access (CDMA), Wideband Code Division Multiple Access (WCDMA), Long Term Evolution (LTE), an e-mail, a Short Messaging Service (SMS), and the like.

The server further includes the power supply 404 (such as a battery) for supplying power to the components. Preferably, the power supply 404 may logically connect to the processor 401 by using a power supply management system, thereby implementing functions, such as charging, discharging, and power consumption management, by using the power supply management system. The power supply 404 may further include one or more of a direct current or alternating current power supply, a re-charging system, a power failure detection circuit, a power supply converter or inverter, a power supply state indicator, and any other components.

The server may further include an input unit 405. The input unit 405 may be configured to receive input digit or character information, and generate a keyboard, mouse, joystick, optical or track ball signal input related to the user setting and function control. Specifically, in a specific embodiment, the input unit 405 may include a touch-sensitive surface and another input device. The touch-sensitive surface, which may also be referred to as a touch display screen or a touch panel, may collect a touch operation of a user on or near the touch-sensitive surface (such as an operation of a user on the touch-sensitive surface or near the touch-sensitive surface by using any suitable object or accessory, such as a finger or a stylus), and drive a corresponding connection apparatus according to a preset program. Optionally, the touch-sensitive surface may include two parts: a touch detection apparatus and a touch controller. The touch detection apparatus detects a touch position of the user, detects a signal generated by the touch operation, and transfers the signal to the touch controller. The touch controller receives touch information from the touch detection apparatus, converts the touch information into touch point coordinates, and sends the touch point coordinates to the processor 401. Moreover, the touch controller can receive and execute a command sent by the processor 401. In addition, the touch-sensitive surface may be may be a resistive, capacitive, infrared, or surface sound wave type touch-sensitive surface. In addition to the touch-sensitive surface, the input unit 405 may include the another input device. Specifically, the another input device may include, but is not limited to, one or more of a physical keyboard, a functional key (such as a volume control key or a switch key), a track ball, a mouse, and a joystick.

The server may further include the display unit 406. The display unit 406 may be configured to display information entered by the user or information provided for the user, and various graphical user interfaces of the server. The graphical user interfaces may be formed by a graph, a text, an icon, a video, or any combination thereof. The display unit 406 may include a display panel. Optionally, the display panel may be configured by using a liquid crystal display (LCD), an organic light-emitting diode (OLED), or the like. Further, the touch-sensitive surface may cover the display panel. After detecting a touch operation on or near the touch-sensitive surface, the touch-sensitive surface transfers the touch operation to the processor 401, so as to determine the type of the touch event. Then, the processor 401 provides a corresponding visual output on the display panel according to the type of the touch event. Although, in FIG. 4, the touch-sensitive surface and the display panel are used as two separate parts to implement input and output functions, in some embodiments, the touch-sensitive surface and the display panel may be integrated to implement the input and output functions.

Although not shown in the figure, the server may further include a camera, a Bluetooth module, and the like. Details are not described herein. Specifically, in this embodiment, the processor 401 in the server loads, into the memory 402 according to the following instructions, executable files corresponding to processes of one or more application programs, and the processor 401 runs the application programs stored in the memory 402 to implement the following various functions:

receiving a domain name resolution request that is sent by a network device such as a recursive DNS and that carries a target domain name that needs to be resolved; resolving the target domain name, to obtain a resolution result; determining whether the resolution result is a network address of a preset type; and if not, updating the target domain name to the resolution result, and going back to the step of resolving the target domain name; or if yes, sending the resolution result to the network device.

For example, configuration information of the target domain name is searched for; and an address to which the target domain name points is determined according to the configuration information, to obtain the resolution result.

Optionally, to improve flexibility and processing efficiency, a record type of a resolution record corresponding to the target domain name may be determined first, and when it is determined that the record type is a CNAME record, and accelerated resolution needs to be performed, the operation of "determining whether the resolution result is a network address of a preset type" is performed. That is, an application program stored in the memory 402 can further implement the following function:

determining, when it is determined that a record type of the configuration information is a CNAME record, whether accelerated resolution needs to be performed on the target domain name; and if yes, after the resolution result is obtained, performing the operation of determining whether the resolution result is a network address of a preset type; or if not, sending the resolution result to the network device after the resolution result is obtained.

Optionally, to reduce procedures and improve processing efficiency, when it is determined that a record type of a resolution record corresponding to the target domain name is an A record, the resolution result may be directly sent to the corresponding network device such as the recursive DNS. That is, the application program stored in the memory 402 can further implement the following function:

sending the resolution result to the network device after the resolution result is obtained when it is determined that a record type of the configuration information is an A record.

Optionally, to prevent a fault when the resolution result continues to be resolved, for example, configuration information corresponding to the resolution result cannot be obtained, before the target domain name is updated to the resolution result, whether the configuration information of the resolution result exists in a local or preset storage device may be determined, and if yes, the operation of updating the target domain name to the resolution result is performed. That is, the application program stored in the memory 402 can further implement the following function:

determining whether configuration information of the resolution result exists; and if yes, performing an operation of updating the target domain name to the resolution result; or if not, sending the resolution result to the network device.

For specific implementations of the foregoing operations, refer to the foregoing embodiments, and details are not described herein again.

It may be learned from the above that, in this embodiment, after receiving the domain name resolution request sent by the network device, the server may resolve the target domain name; when determining that the resolution result is not a network address of a preset type, use the resolution result as a new target domain name and continue to perform resolution; and when obtaining a finally required network address, return the resolution result to the network device at a time. It may be learned that, for multiple levels of CNAME records, in this solution, only one resolution request needs to be made to obtain the required resolution result. Therefore, compared with an existing solution in which multiple resolution requests need to be made, this solution can simplify a procedure, shorten a resolution time, and greatly improve overall resolution efficiency.

A person of ordinary skill in the art may understand that all or some of the steps of the methods in the embodiments may be implemented by a program instructing relevant hardware. The program may be stored in a computer-readable storage medium. The storage medium may include: a read-only memory (ROM), a RAM, a magnetic disk, or an optical disc.

An embodiment of the present disclosure further provides a non-volatile computer-readable storage medium, storing a computer program, when being executed by a processor, the program implementing the steps of any one of the foregoing methods.

The domain name resolution method, apparatus, and system in the embodiments of the present disclosure are described in detail above. The principle and the implementation of the present disclosure are described herein through specific examples. The descriptions of the embodiments of the present disclosure are merely provided for ease of understanding of the method and core ideas of the present disclosure. In addition, a person skilled in the art may make variations and modifications to the present disclosure in terms of the specific implementations and application scopes according to the ideas of the present disclosure. Therefore, the specification shall not be construed as a limit to the present disclosure.

What is claimed is:

1. A domain name resolution method performed at a server having one or more processors and memory storing a plurality of programs to be executed by the one or more processors, the method comprising:
   receiving a domain name resolution request sent by a network device, the domain name resolution request carrying a first target domain name that needs to be resolved;
   using the first target domain name as an initial value of a second target domain name;
   resolving the second target domain name, to obtain a corresponding resolution result;
   determining whether the resolution result corresponds to a network address of a preset type; and
   repeating the aforementioned operations using the resolution result as the second target domain name until a resolution result corresponding to the network address of the preset type is obtained; and
   after obtaining the resolution result corresponding to the network address of the preset type, returning the resolution result to the network device.

2. The method according to claim 1, wherein the operation of resolving the second target domain name, to obtain a corresponding resolution result comprises:
   searching for configuration information of the second target domain name; and
   determining, according to the configuration information, an address to which the second target domain name points, to obtain the corresponding resolution result.

3. The method according to claim 2, further comprising:
   after searching for configuration information of the second target domain name:
   determining, when a record type of the configuration information is a canonical name (CNAME) record, whether accelerated resolution needs to be performed on the second target domain name;
   if yes, performing the step of determining whether the resolution result corresponds to the network address of the preset type; and
   if not, sending the resolution result to the network device.

4. The method according to claim 2, further comprising:
   after searching for configuration information of the second target domain name:
   sending the resolution result to the network device when a record type of the configuration information is an A record.

5. The method according to claim 1, further comprising:
   before using the resolution result as the second target domain name:
   determining whether configuration information of the resolution result exists;
   if yes, performing the step of using the resolution result as the second target domain name; and
   if not, sending the resolution result to the network device.

6. The method according to claim 1, wherein the determining whether the resolution result is a network address of a preset type comprises:
   determining whether the resolution result is an Internet Protocol (IP) address.

7. A server for domain name resolution, comprising one or more processors, memory coupled to the one or more processors, and a plurality of computer-readable instructions that, when executed by the one or more processors, cause the server to perform the following operations:
- receiving a domain name resolution request sent by a network device, the domain name resolution request carrying a first target domain name that needs to be resolved;
- using the first target domain name as an initial value of a second target domain name;
- resolving the second target domain name, to obtain a corresponding resolution result;
- determining whether the resolution result corresponds to a network address of a preset type; and
- repeating the aforementioned operations using the resolution result as the second target domain name until a resolution result corresponding to the network address of the preset type is obtained; and
- after obtaining the resolution result corresponding to the network address of the preset type, returning the resolution result to the network device.

8. The server according to claim 7, wherein the operation of resolving the second target domain name, to obtain a corresponding resolution result comprises:
- searching for configuration information of the second target domain name; and
- determining, according to the configuration information, an address to which the second target domain name points, to obtain the corresponding resolution result.

9. The server according to claim 8, wherein the operations further comprise:
- after searching for configuration information of the second target domain name:
- determining, when a record type of the configuration information is a canonical name (CNAME) record, whether accelerated resolution needs to be performed on the second target domain name;
- if yes, performing the step of determining whether the resolution result corresponds to the network address of the preset type; and
- if not, sending the resolution result to the network device.

10. The server according to claim 8, wherein the operations further comprise:
- after searching for configuration information of the second target domain name:
- sending the resolution result to the network device when a record type of the configuration information is an A record.

11. The server according to claim 7, wherein the operations further comprise:
- before using the resolution result as the second target domain name:
- determining whether configuration information of the resolution result exists;
- if yes, performing the step of using the resolution result as the second target domain name; and
- if not, sending the resolution result to the network device.

12. The server according to claim 7, wherein the operation of determining whether the resolution result is a network address of a preset type comprises:
- determining whether the resolution result is an Internet Protocol (IP) address.

13. A non-transitory computer readable storage medium storing a plurality of instructions in connection with a server having one or more processors, wherein the plurality of instructions, when executed by the one or more processors, cause the server to perform a plurality of operations including:
- receiving a domain name resolution request sent by a network device, the domain name resolution request carrying a first target domain name that needs to be resolved;
- using the first target domain name as an initial value of a second target domain name;
- resolving the second target domain name, to obtain a corresponding resolution result;
- determining whether the resolution result corresponds to a network address of a preset type; and
- repeating the aforementioned operations using the resolution result as the second target domain name until a resolution result corresponding to the network address of the preset type is obtained; and
- after obtaining the resolution result corresponding to the network address of the preset type, returning the resolution result to the network device.

14. The non-transitory computer readable storage medium according to claim 13, wherein the operation of resolving the second target domain name, to obtain a corresponding resolution result comprises:
- searching for configuration information of the second target domain name; and
- determining, according to the configuration information, an address to which the second target domain name points, to obtain the corresponding resolution result.

15. The non-transitory computer readable storage medium according to claim 14, wherein the operations further comprise:
- after searching for configuration information of the second target domain name:
- determining, when a record type of the configuration information is a canonical name (CNAME) record, whether accelerated resolution needs to be performed on the second target domain name;
- if yes, performing the step of determining whether the resolution result corresponds to the network address of the preset type; and
- if not, sending the resolution result to the network device.

16. The non-transitory computer readable storage medium according to claim 14, wherein the operations further comprise:
- after searching for configuration information of the second target domain name:
- sending the resolution result to the network device when a record type of the configuration information is an A record.

17. The non-transitory computer readable storage medium according to claim 13, wherein the operations further comprise:
- before using the resolution result as the second target domain name:
- determining whether configuration information of the resolution result exists;
- if yes, performing the step of using the resolution result as the second target domain name; and
- if not, sending the resolution result to the network device.

18. The non-transitory computer readable storage medium according to claim 13, wherein the operation of determining whether the resolution result is a network address of a preset type comprises:
- determining whether the resolution result is an Internet Protocol (IP) address.

* * * * *